(12) United States Patent
Frye (10) Patent No.: US 12,288,464 B2
(45) Date of Patent: Apr. 29, 2025

(54) METHOD AND DEVICE FOR CONTROLLING A TRANSMIT POWER OF AN ACTIVE VEHICLE SURROUND SENSOR (71) Applicant: Robert Bosch GmbH, Stuttgart (DE)

(72) Inventor: Tobias Frye, Braunschweig (DE)

(73) Assignee: ROBERT BOSCH GMBH, Stuttgart (DE)

(*) Notice: Subject to any disclaimer, the term of this patent is extended or adjusted under 35 U.S.C. 154(b) by 332 days.

(21) Appl. No.: 17/949,372

(22) Filed: Sep. 21, 2022

(65) Prior Publication Data
US 2023/0091772 A1 Mar. 23, 2023

(30) Foreign Application Priority Data
Sep. 23, 2021 (DE) .................... 10 2021 210 613.7

(51) Int. Cl.
G08G 1/09 (2006.01)
B60W 60/00 (2020.01)
(Continued)

(52) U.S. Cl.
CPC ........... *G08G 1/091* (2013.01); *B60W 60/001* (2020.02); *G08G 1/0112* (2013.01);
(Continued)

(58) Field of Classification Search
CPC .... G08G 1/091; G08G 1/0112; G08G 1/0116; G08G 1/0137; G08G 1/04; B60W 60/001;
(Continued)

(56) References Cited

U.S. PATENT DOCUMENTS 7,817,064 B2 * 10/2010 Nishida ............ G08G 1/096725
340/539.22
9,720,411 B2 * 8/2017 Crombez ............. G05D 1/0259
(Continued)

FOREIGN PATENT DOCUMENTS

DE 102004017720 A1 10/2005
DE 102005060131 A1 6/2007
(Continued)

*Primary Examiner* — Mussa A Shaawat
(74) *Attorney, Agent, or Firm* — NORTON ROSE FULBRIGHT US LLP (57) ABSTRACT A method is provided for controlling a transmit power of at least one active vehicle surround sensor of a vehicle driven in an at least partially automated manner, at least one automated driving function of the vehicle being implemented on the basis of surroundings data acquired by the active vehicle surround sensor and/or on the basis of data received from an infrastructure. The method includes: receiving at least one first message from an infrastructure; generating, depending on information in the received first message, control signals for reducing the transmit power of an active vehicle surround sensor, and outputting the control signals; verifying, on the basis of surroundings conditions, whether the transmit power of the active vehicle surround sensor can be increased again; generating, depending on the verification, control signals for increasing the transmit power of the active vehicle surround sensor, and outputting the control signals.

13 Claims, 5 Drawing Sheets (51) Int. Cl.
*G08G 1/01* (2006.01)
*G08G 1/04* (2006.01)

(52) U.S. Cl.
CPC ......... *G08G 1/0116* (2013.01); *G08G 1/0137* (2013.01); *G08G 1/04* (2013.01); *B60W 2420/403* (2013.01); *B60W 2420/408* (2024.01); *B60W 2556/45* (2020.02); *B60W 2756/10* (2020.02)

(58) Field of Classification Search
CPC ..... B60W 2420/403; B60W 2420/408; B60W 2556/45; B60W 2756/10; G01S 13/862; G01S 13/91; G01S 7/003; G01S 2013/9324; G01S 7/023
See application file for complete search history.

(56) References Cited

U.S. PATENT DOCUMENTS

| | | | |
|---|---|---|---|
| 10,783,779 B1* | 9/2020 | Meyer | G08G 1/096783 |
| 11,288,959 B2* | 3/2022 | Zack | G05D 1/0297 |
| 2011/0035140 A1* | 2/2011 | Candy | E01F 9/578 |
| | | | 701/119 |
| 2017/0372431 A1* | 12/2017 | Perl | G07C 5/008 |
| 2018/0136332 A1* | 5/2018 | Barfield, Jr. | G06V 10/7784 |
| 2019/0113916 A1* | 4/2019 | Guo | A61B 5/6893 |
| 2021/0183246 A1* | 6/2021 | Zack | G08G 1/0116 |
| 2022/0126832 A1* | 4/2022 | Ewert | B60W 10/24 |
| 2022/0159425 A1* | 5/2022 | Schiegg | G08G 1/096741 |
| 2022/0169270 A1* | 6/2022 | Wei | B60W 60/001 |

FOREIGN PATENT DOCUMENTS

| | | |
|---|---|---|
| DE | 102007046767 A1 | 4/2009 |
| DE | 102012215343 A1 | 5/2014 |
| DE | 102016202805 A1 | 8/2017 |
| DE | 102017114049 A1 | 1/2018 |
| DE | 102018219376 A1 | 5/2020 |
| DE | 102019205900 A1 | 10/2020 |
| DE | 102019208899 A1 | 12/2020 |
| EP | 3495836 A1 | 6/2019 |

* cited by examiner

METHOD AND DEVICE FOR CONTROLLING A TRANSMIT POWER OF AN ACTIVE VEHICLE SURROUND SENSOR

CROSS REFERENCE

The present application claims the benefit under 35 U.S.C. 119 of German Patent Application No. DE 10 2021 210 613.7 filed on Sep. 23, 2021, which is expressly incorporated herein by reference in its entirety.

FIELD

The present invention relates to a method and to a device for controlling a transmit power of a vehicle surround sensor of a vehicle driven in an at least partially automated manner. The present invention also relates to a vehicle driven in an at least partially automated manner. The present invention also relates to an infrastructure system for assisting the driving of a vehicle driven in an at least partially automated manner. The present invention further relates to a computer program.

BACKGROUND INFORMATION

German Patent Application No. DE 10 2017 114 049 A1 describes autonomous vehicle navigation, and in particular systems for determining and executing the routes of autonomous vehicles on the basis of any of various elements.

European Patent Application No. EP 3 495 836 A1 describes a method for measuring distances between vehicles in a convoy.

German Patent Application No. DE 10 2012 215 343 A1 describes a method for implementing a safety function of a vehicle.

For driver-assistance systems or highly automated driving functions, surround sensors are increasingly being installed in modern vehicles. These include ultrasonic sensors, cameras, radar, and LiDAR (lasers), which can be used, for example, for functions such as automatic emergency braking (AEB) or adaptive cruise control (ACC). The camera is the only sensor out of the example surround sensor types that only receives signals but does not actively emit signals. All sensors that emit signals can disrupt each other; in other words, having too many similar sensors in the vehicles may impair the performance of other similar sensors. New strategies for preventing interference are therefore needed.

In "infrastructure-assisted" automated driving, vehicles are controlled from an infrastructure or are fed with information regarding objects in their surroundings. Assisted automated driving is beneficial particularly in areas or on stretches of road in which the sensor system on board each vehicle reaches its limits, for example at tunnel entrances, where radar sensors or cameras may degrade or supply incorrect data. For this purpose, surround sensors on the infrastructure are needed. Active surround sensors such as radar sensors or LiDAR sensors are typically also used in this case. These may present additional potential for disruption for similar sensors on vehicles, in particular since they often radiate in the opposite direction to the traffic. Conversely, it is also possible that vehicle surround sensors may disrupt the sensors on the infrastructure.

SUMMARY

An object of the present invention includes that of reducing disruptions or interference between infrastructure sensors and vehicle surround sensors. This object may be achieved by features of the present invention. Advantageous example embodiments of the present invention are disclosed herein.

According to a first aspect of the present invention, a method is provided for controlling a transmit power of at least one active vehicle surround sensor of a vehicle driven in an at least partially automated manner, at least one automated driving function of the vehicle being implemented on the basis of surroundings data acquired by the active vehicle surround sensor and/or on the basis of data received from an infrastructure. According to an example embodiment of the present invention, the method comprises at least the steps of:

receiving at least one first message from an infrastructure;

generating, depending on information in the received first message, control signals for reducing the transmit power of an active vehicle surround sensor, and outputting the control signals;

verifying, on the basis of surroundings conditions, whether the transmit power of the active vehicle surround sensor can be increased again;

generating, depending on the verification, control signals for increasing the transmit power of the active vehicle surround sensor, and outputting the control signals.

These method steps can be carried out repeatedly, in particular continuously or at particular intervals.

In this context, an active vehicle surround sensor should be taken to mean, for example, a vehicle surround sensor that initially actively emits a signal, for example an electromagnetic or acoustic signal, for a measurement. This signal is reflected by objects, for example, and portions of the reflected signal can be detected by the active vehicle surround sensor. By analyzing the received signal in relation to the actively transmitted signal, properties of the reflecting objects can be determined, for example a distance, a speed, a movement direction, etc. Sensors of this kind are available in many embodiments from the prior art and are routine for a person skilled in the art. Examples of active vehicle surround sensors include radar sensors, LiDAR sensors, and ultrasonic sensors.

In most cases, reducing the transmit power of an active vehicle surround sensor entails a drop in the range and/or accuracy of the vehicle surround sensor. This may affect the safety of an automated driving function of the vehicle. Therefore, a basic feature of the present invention is to decide, before reducing the transmit power of an active vehicle surround sensor, whether the transmit power can be reduced and, for example, for how long, depending on a message received from an infrastructure, since the infrastructure, for example, can reliably provide the surroundings information that is needed for the automated driving function of the vehicle in a particular area, meaning that the full transmit power of the vehicle surround sensor is not required within that area.

According to a possible configuration of the present invention, the first message communicated by an infrastructure may comprise infrastructure surroundings information that is generated using a surroundings sensor of the infrastructure. The first message may in particular comprise an object list, for example in the form of a collective perception message (CPM). Alternatively or additionally, the first message may comprise control commands for executing an automated driving function, for example in the form of a maneuver coordination message (MCM). The first message can thus be used to allow the vehicle to be driven in an at least partially automated manner, or to assist therewith.

Receipt of the first message signals that the vehicle is now located in a region in which assistance by the infrastructure is available on the one hand, but mutual disruption among active vehicle surround sensors and active surround sensors of the infrastructure (infrastructure sensors) is possible on the other hand.

A check is then carried out as to whether the automated driving function of the vehicle can be safely executed on the basis of the first message. In this context, "safely" should in particular also be construed to mean "securely", i.e., "safe" as in preventing harm and maintaining the at least partially automated driving mode without putting other road users at risk, but also "secure" as in security against external tampering or the undesirable outflow of data. If the check reveals that the automated driving function of the vehicle can be safely executed on the basis of the first message, the transmit power of an active vehicle surround sensor is reduced since the active vehicle surround sensor, or the surroundings information acquired thereby, will not be needed in order to safely implement the automated driving function. The check may, for example, comprise comparing object properties acquired by the vehicle surround sensor with properties of an object list received together with the first message. If the objects and their properties correlate, within predetermined tolerance limits, it can be accepted that the automated driving function of the vehicle can be safely executed on the basis of the first message. In this context, "safely" means in particular that collisions and unnecessary emergency braking are avoided.

This configuration may achieve the technical advantage whereby the transmit power of the active vehicle surround sensor can be controlled efficiently, safely, and in accordance with requirements.

Alternatively or additionally, the first message may comprise an explicit request from the infrastructure to reduce the transmit power of an active vehicle surround sensor. This is advantageous in particular when the infrastructure has already detected an actual disruption.

Preferably, before the transmit power of an active vehicle surround sensor is reduced, it is checked whether the information in the first message is reliable. By way of example, this can be done using security certificates or the like. This advantageously ensures that the first message has actually been communicated by the infrastructure and that the content has not been altered. External attacks can thus be prevented.

In a possible example configuration of the present invention, reducing the transmit power of an active vehicle surround sensor comprises deactivating the active vehicle surround sensor. In other words, the transmit power of the active vehicle surround sensor is reduced to zero.

In an alternative configuration, the transmit power of an active vehicle surround sensor is reduced such that the active vehicle surround sensor can only acquire surroundings information from the vicinity of the vehicle. Certain driving functions that process in particular surroundings information from the immediate vicinity of the vehicle, for example an emergency braking assistance function, can thus still remain active or available regardless of assistance by the infrastructure. In this case, the vicinity of the vehicle may be defined depending on the speed, for example. If, for example, an emergency braking assistance function is intended to remain available at a speed of 80 km/h, and there is a system latency of 0.2 s in the emergency braking assistance function, the vicinity is approximately 40 m. At a normal transmit power, a long-range front radar sensor has a range of 250 m.

In another preferred configuration of the present invention, it is verified, on the basis of surroundings conditions, whether the transmit power of the active vehicle surround sensor can be increased again, on the basis of a determination of a current position of the vehicle relative to the infrastructure. The transmit power of the active vehicle surround sensor can be increased again when the vehicle is in a particular relative position to the infrastructure and/or at a particular distance therefrom. The transmit power of the active vehicle surround sensor may be increased again to the originally set value when, for example, the vehicle moves out of the region that can be monitored by the infrastructure, or shortly before the vehicle does so, such that when the vehicle leaves an area of influence of the infrastructure, an at least partially automated driving function can be executed again on the basis of surroundings data acquired by the active vehicle surround sensor. The current position of the vehicle may be determined, for example, using a satellite-based method (e.g., GPS). The current position may be compared with a digital map that is available in the vehicle, for example communicated by the infrastructure, and in which the areas of influence of the infrastructure are recorded. Alternatively or additionally, the digital map may be constructed in an automated manner by a plurality of vehicles using a cloud backend, or the vehicle itself recognizes the infrastructure-monitored region early on because it has already driven on that stretch before.

Similarly, it can also be identified that the vehicle is approaching an area of influence of an infrastructure so that preparatory steps for implementing an automated driving function of the vehicle, based on data yet to be received from the infrastructure, may already be initiated before the first message is received from the infrastructure.

According to a second aspect of the present invention, a device is provided for controlling a transmit power of at least one active vehicle surround sensor of a vehicle driven in an at least partially automated manner, said device being configured to carry out a method according to the first aspect. The device comprises a receiver unit for receiving, in particular wirelessly receiving, first messages from an infrastructure, and a control unit for controlling a transmit power of an active vehicle surround sensor.

According to a third aspect of the present invention, a driver-assistance system for driving a vehicle, in particular a motor vehicle, in an at least partially automated manner is provided, comprising a device according to the second aspect and at least one active vehicle surround sensor, the transmit power of which can be controlled by the device. The driver-assistance system is configured to implement at least one automated driving function of the vehicle on the basis of surroundings data acquired by the active vehicle surround sensor and/or on the basis of data received from an infrastructure.

According to a fourth aspect of the present invention, a vehicle, in particular a motor vehicle, comprising a driver-assistance system according to the third aspect is provided.

According to a fifth aspect of the present invention, a method is provided for controlling a transmit power of at least one active infrastructure sensor of an infrastructure system for assisting at least partially automated driving of a vehicle, at least one automated driving function of the vehicle being implemented on the basis of data transmitted by the infrastructure system. According to the method, a measured variable that represents an impairment in the measurement quality of the active infrastructure sensor owing to interference caused by active vehicle surround sensors of vehicles in the surroundings of the one infrastructure system is determined periodically or continuously.

Depending on the measured variable, a message can be transmitted to the vehicles in the surroundings of the infrastructure system, containing a request to reduce the transmit power of the active vehicle surround sensors of the vehicles.

Alternatively or additionally, control signals for reducing the transmit power of the active infrastructure sensor can be generated depending on the measured variable, and output. This is advantageous in particular when the infrastructure data are not that important for the vehicle but merely represent extra information for the at least partially automated driving function and the vehicle itself is in control. In this case, low levels of interference may help the vehicle surround sensor. On the basis of the measured variable, which continues to be acquired continuously or periodically, it is then checked whether the transmit power of the active infrastructure sensor can be increased again. Depending on the verification, control signals for increasing the transmit power of the active infrastructure sensor are generated and output.

According to a sixth aspect of the present invention, an infrastructure system for assisting at least partially automated driving of a vehicle according to the fourth aspect is provided. According to an example embodiment of the present invention, the infrastructure system comprises the following:
  at least one active infrastructure sensor for acquiring surroundings information;
  an arithmetic logic unit for generating an object list on the basis of the acquired surroundings information, and optionally for generating control commands for executing an automated driving function on the basis of the acquired surroundings information;
  a communication unit for transmitting a first message, the first message comprising the object list and/or the control commands for executing an automated driving function and/or a request to reduce the transmit power of an active vehicle surround sensor of the vehicle.

According to a seventh aspect of the present invention, a computer program is provided that comprises commands which, when the computer program is executed by a computer, cause said computer to carry out a method according to the first aspect and/or the fifth aspect of the present invention.

The wording "at least partially automated driving" covers one or more of the following cases: assisted driving, partially automated driving, highly automated driving, fully automated driving. The wording "at least partially automated" thus covers one or more of the following: assisted, partially automated, highly automated, fully automated.

"Assisted driving" means that a driver of the motor vehicle constantly carries out either the steering or the acceleration/deceleration of the motor vehicle. The other driving task (i.e., controlling either the acceleration/deceleration or steering of the motor vehicle) is performed automatically. In other words, when the motor vehicle is driven with "assisted driving", either the steering or the acceleration/deceleration is controlled automatically.

"Partially automated driving" means that the acceleration/deceleration and steering of the motor vehicle are controlled automatically in a specific situation (for example when driving on a motorway, driving in a parking garage, passing an object, driving within a lane defined by lane markings) and/or for a particular period of time. A driver of the motor vehicle need not themselves manually control the acceleration/deceleration and steering of the motor vehicle. However, the driver has to constantly monitor the automatic control of the acceleration/deceleration and steering so that they can manually intervene if necessary. The driver has to be ready at all times to take over full control of driving the motor vehicle.

"Highly automated driving" means that the acceleration/deceleration and steering of the motor vehicle are controlled automatically in a specific situation (for example when driving on a motorway, driving in a parking garage, passing an object, driving within a lane defined by lane markings) for a particular period of time. A driver of the motor vehicle need not themselves manually control the acceleration/deceleration and steering of the motor vehicle. There is no need for the driver to constantly monitor the automatic control of the acceleration/deceleration and steering in case they have to manually intervene. If necessary, a take-over prompt is automatically output to the driver for them to take over the control of the acceleration/deceleration and steering, in particular output with enough of a time margin. Therefore, the driver potentially has to be able to take over the control of the acceleration/deceleration and steering. Limits for the automatic control of the steering and acceleration/deceleration are automatically identified. In highly automated driving, it is not possible automatically to bring about a minimal-risk status in every starting situation.

"Fully automated driving" means that the acceleration/deceleration and steering of the motor vehicle are controlled automatically in a specific situation (for example when driving on a motorway, driving in a parking garage, passing an object, driving within a lane defined by lane markings). A driver of the motor vehicle need not themselves manually control the acceleration/deceleration and steering of the motor vehicle. There is no need for the driver to monitor the automatic control of the acceleration/deceleration and steering in case they have to manually intervene. Before the automatic control of the steering and acceleration/deceleration is terminated, a prompt is automatically sent to the driver to take over the driving task (controlling the steering and acceleration/deceleration of the motor vehicle), in particular with enough of a time margin. If the driver does not take over the driving task, the vehicle is automatically returned to a minimal-risk status. Limits for the automatic control of the steering and acceleration/deceleration are automatically identified. In every situation, it is possible automatically to revert to a minimal-risk system status.

According to a specific example embodiment of the present invention, the method according to the first aspect is a computer-implemented method.

According to a specific example embodiment of the present invention, the method according to the first aspect is carried out or implemented using the device according to the second aspect.

Device features analogously result from corresponding method features, and vice versa. In particular, this means that technical functions of the device according to the second aspect analogously result from corresponding technical functionalities of the method according to the first aspect, and vice versa.

The specific embodiments and exemplary embodiments described in the description may each be combined in any way, even when not explicitly described.

BRIEF DESCRIPTION OF THE DRAWINGS

Specific embodiments of the present invention will be described in detail with reference to the accompanying figures.

DETAILED DESCRIPTION OF EXAMPLE EMBODIMENTS

In the following description of the exemplary embodiments of the present invention, identical elements are denoted by identical reference numerals, and where applicable the description of these elements will not be repeated. The figures are merely a schematic representation of the subject matter of the present invention.

Figure 1A:
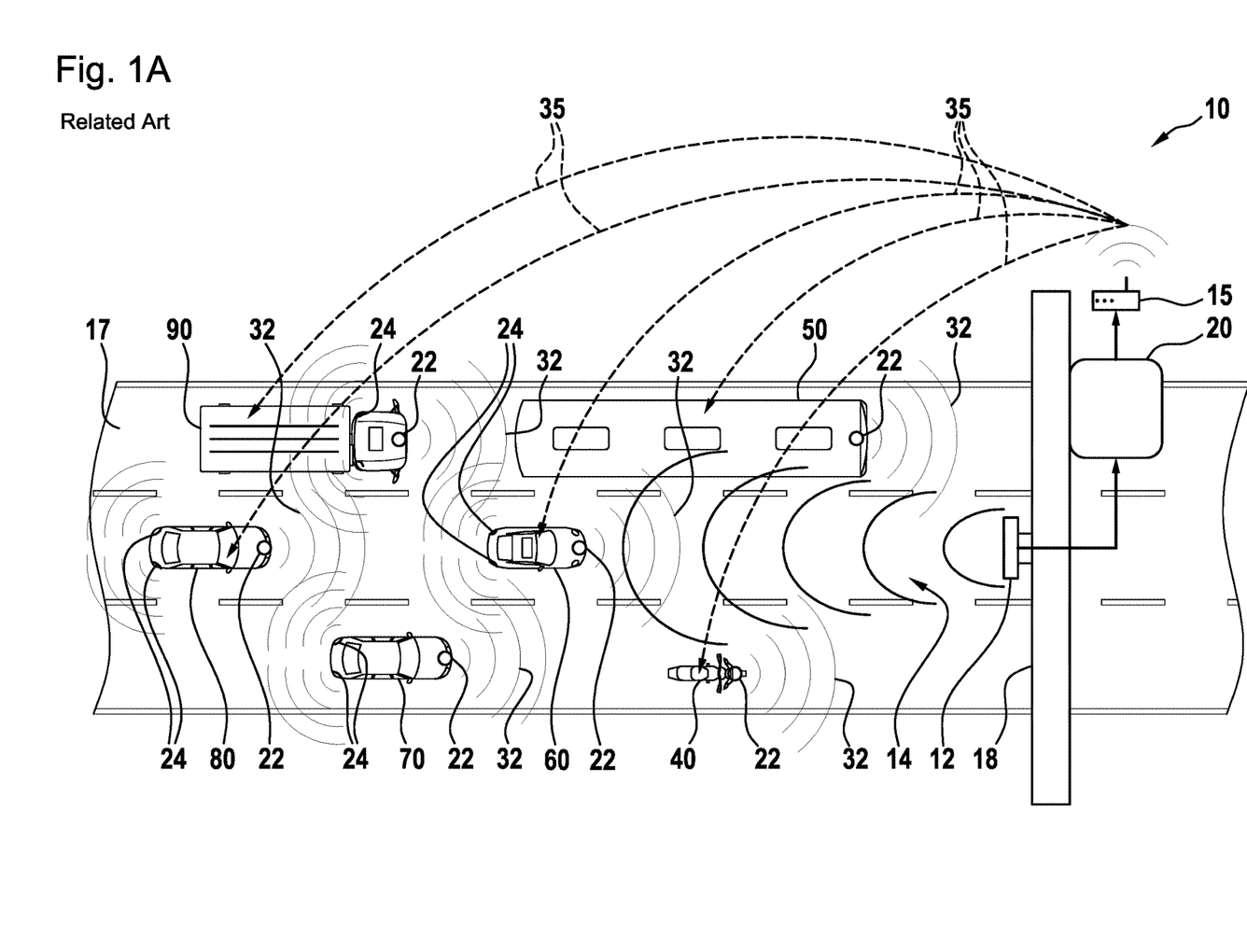
FIG. 1A shows an infrastructure system for assisting at least partially automated driving of a vehicle according to the related art.

FIG. 1A shows an infrastructure system 10 for assisting at least partially automated driving of vehicles traveling in the area of influence 17 of the infrastructure system 10. For this purpose, the infrastructure system 10 comprises an active infrastructure sensor 12, which is configured as a radar sensor in this example and is used for acquiring surroundings information in the form of measurement data from the area of influence 17 of the infrastructure system 10. To acquire the measurement data, the infrastructure sensor 12 has a particular transmit power, indicated by the schematically illustrated wave fronts 14. The infrastructure system 10 has an arithmetic logic unit 20, which generates object lists from the acquired surroundings information. The object lists include, for example, objects in the area of influence 17 and their properties, such as positions, speeds, movement directions, etc. The infrastructure system 10 has a communication unit 15, which is configured to transmit the object lists in the form of a V2X message 35 (for example a cooperative perception message, CPM) to vehicles 40, 50, 60, 70, 80, 90 in the area of influence 17 wirelessly, for example via direct communication technology such as DSRC or C-V2X, or via mobile communications. The communication unit 15 communicates current object lists by way of V2X messages to the vehicles in the area of influence 17 of the infrastructure system 10, preferably continuously or at regular intervals.

The vehicles 40, 50, 60, 70, 80, 90 currently located in the area of influence 17 of the infrastructure system 10 in the situation shown have active vehicle surround sensors 22, 24. For example, the vehicles 40, 50, 60, 70, 80, 90 each have an active vehicle surround sensor 22 configured as a front radar. In addition, the vehicles 60, 70, 80, and 90 have additional active vehicle surround sensors 24 configured as side or corner radars.

In the infrastructure system configuration shown in FIG. 1A, all the active vehicle surround sensors 22, 24 are transmitting at their full transmit power, indicated by the schematically illustrated wave fronts 32, 34. This can lead to mutual disruption between the active vehicle surround sensors 22, 24 and the active infrastructure sensor 12.

Figure 1B:
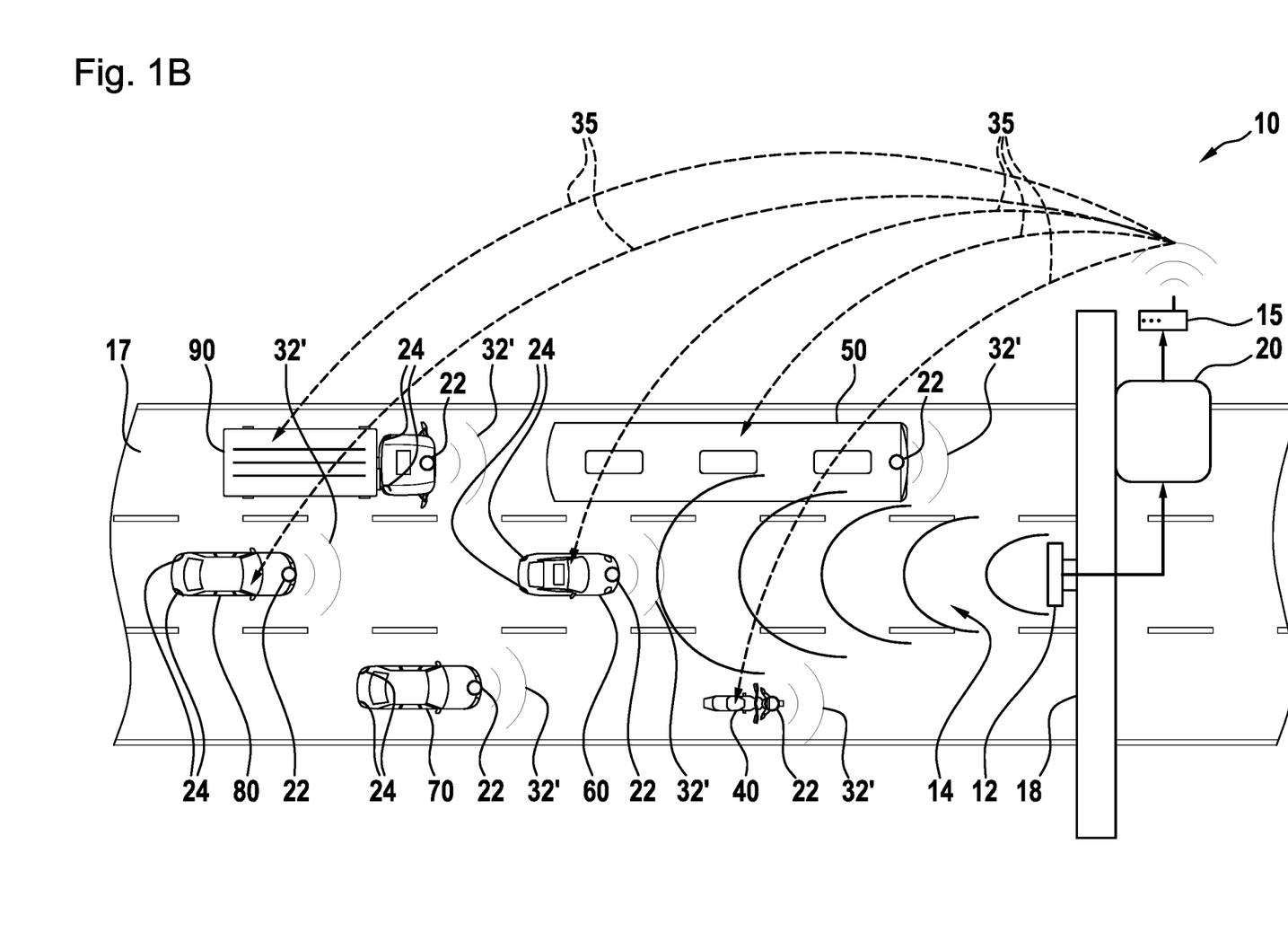
FIGS. 1B and 1C show exemplary embodiments of infrastructure systems for assisting at least partially automated driving of a vehicle according to the present invention.

FIG. 1B shows an exemplary embodiment of an infrastructure system 10 for assisting at least partially automated driving of a vehicle that is using a method according to an example embodiment the present invention in order to prevent, or at least reduce, the mutual disruptions between the various active vehicle surround sensors 22, 24 and the active infrastructure sensor 12.

The construction of the infrastructure system 10 corresponds to the construction shown in FIG. 1A. Unlike FIG. 1A, depending on information in the received V2X message 35, control signals for reducing the transmit power of the active vehicle surround sensors 22, 24 are generated in the vehicles 40, 50, 60, 70, 80, 90 and output. For this purpose, the V2X message 35 may contain an explicit prompt to reduce the transmit power, in particular when interference or disruption caused by the active vehicle surround sensors 22, 24 has been detected by the infrastructure sensor system 12. Alternatively or additionally, it can be checked whether an object list communicated along with the V2X message 35 contains enough information to safely execute an at least partially automated driving function of the relevant vehicle 40, 50, 60, 70, 80, 90 without the measurement data acquired by the active vehicle surround sensors 22, 24 additionally being needed.

By way of example, the vehicles 40, 50, 60, 70, 80, 90 have devices configured according to the present invention for controlling a transmit power of at least one active vehicle surround sensor. If it is decided that an at least partially automated driving function can be safely implemented on the basis of the information in the message 35, then in the example according to FIG. 1B the active vehicle surround sensors 24, configured as side or corner radars, of the vehicles 60, 70, 80, and 90 are deactivated and the relevant transmit power of the active vehicle surround sensors 22, configured as front radars, of the vehicles 40, 50, 60, 70, 80, 90 is reduced, as indicated by the wave fronts 32'.

In the vehicles 40, 50, 60, 70, 80, 90, it is continuously checked on the basis of surroundings conditions whether the transmit power of the active vehicle surround sensors 22, 24 can be increased again, and depending on the verification control signals for increasing the transmit power of the active vehicle surround sensors 22, 24 are generated and output. A surroundings condition of this kind may be, for example, that the corresponding vehicle leaves the area of influence 17 or will do so shortly. Alternatively or additionally, it can be checked, for example, whether the received V2X messages 35 still contain enough information, in terms of scope and/or quality, to enable safe assistance of at least partially automated driving of the vehicle in question.

Figure 1C:
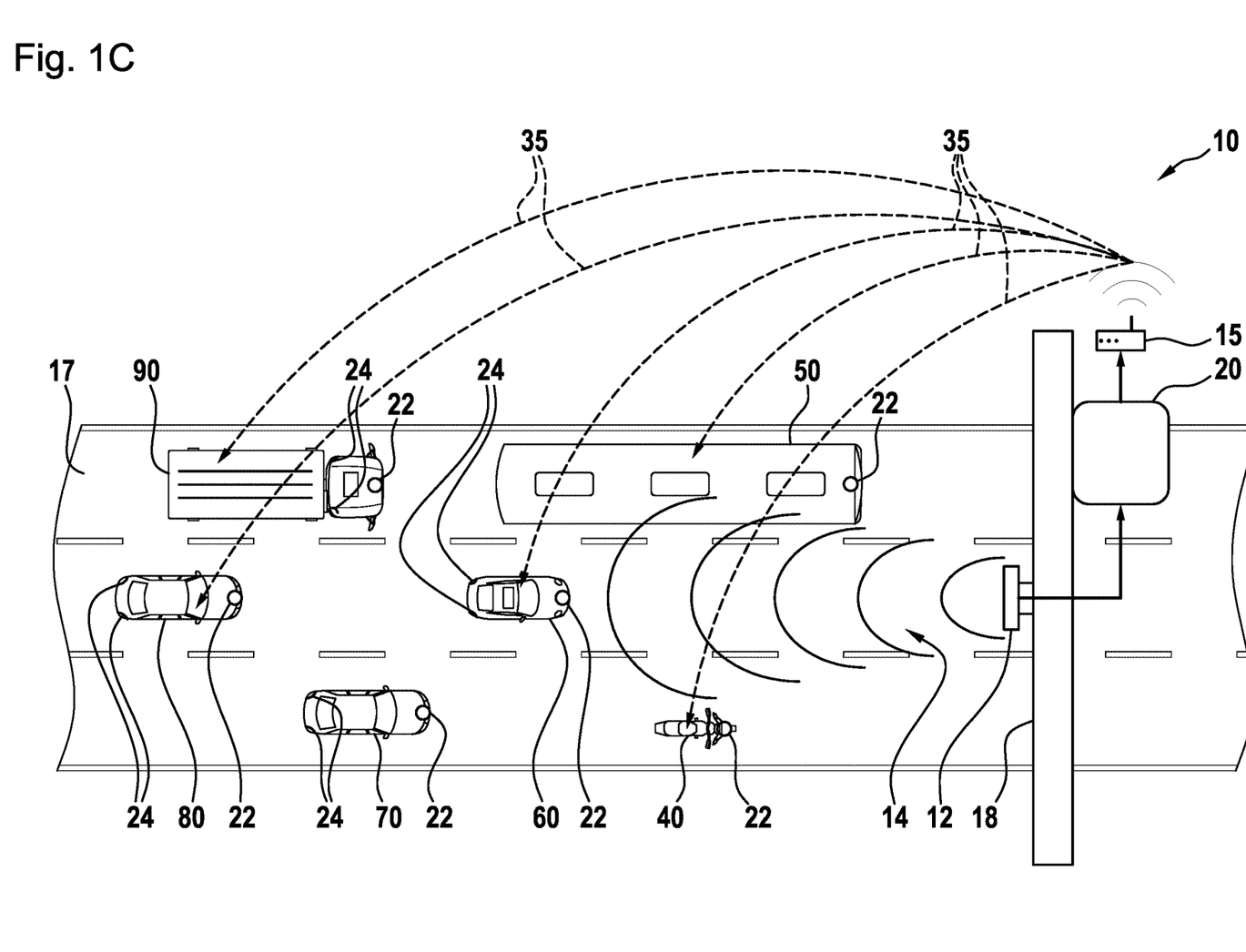

FIG. 1C shows an alternative exemplary embodiment of an infrastructure system 10 for assisting at least partially automated driving of a vehicle that is using a method according to the present invention in order to reduce mutual disruptions between the various active vehicle surround sensors 22, 24 and the active infrastructure sensor 12. Unlike the configuration according to FIG. 1B, in this case control signals for reducing the transmit power of the active vehicle surround sensors 22, 24 are generated and output such that both the active vehicle surround sensors 24, configured as side or corner radars, of the vehicles 60, 70, 80, and 90 and the active vehicle surround sensors 22, configured as front radars, of the vehicles 40, 50, 60, 70, 80, 90 are deactivated, i.e., their transmit power is reduced to zero.

Figure 2:
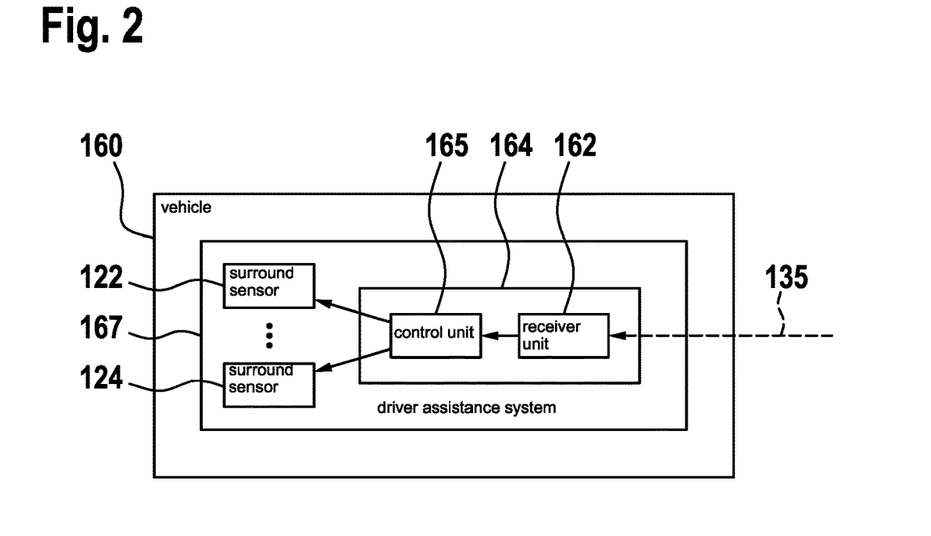
FIG. 2 schematically shows a vehicle comprising a driver-assistance system according to an exemplary embodiment of the present invention.

FIG. 2 schematically shows a vehicle 160 driven in an automated manner. The vehicle 160 comprises a plurality of active vehicle surround sensors 122, 124 and a device 164 for controlling a transmit power of at least one of the active vehicle surround sensors 122, 124 of the vehicle 160. The device 164 has a receiver unit 162, which is configured for wirelessly receiving first messages 135 from an infrastructure; for example, the receiver unit 162 may be configured for receiving V2X messages as per the CPM standard. The device 164 has a control unit 165 for controlling a transmit power of the active vehicle surround sensors 122, 124, said control unit being configured to generate, depending on information in the received first message 135, control signals for reducing the transmit power of an active vehicle surround sensor, and to output the control signals. For this purpose, the control unit 165 may comprise a logic circuit using which it can be checked whether the information in the first message 135 is, for example, sufficient for safely implementing an at least partially automated driving function of the vehicle 160 when the vehicle surround sensors 122, 124 are operated at a lower transmit power. In addition, the control unit 165 can check whether a transmit power of the active vehicle surround sensors 122, 124 can be increased again, and if appropriate it can generate and output corresponding control signals. For this purpose, the control unit 165 may, for example, also analyze information from received messages 135 and/or analyze a current position of the vehicle 160 relative to an infrastructure transmitting the messages 135.

The vehicle 160 has a driver-assistance system 167 for driving the vehicle, which comprises the active vehicle surround sensors 122, 124, in an at least partially automated manner. The driver-assistance system 167 is configured to implement at least one automated driving function of the vehicle on the basis of surroundings data acquired by the active vehicle surround sensors 122, 124 and/or on the basis of data that are received from an infrastructure and, for example, included in the message 135.

Figure 3:
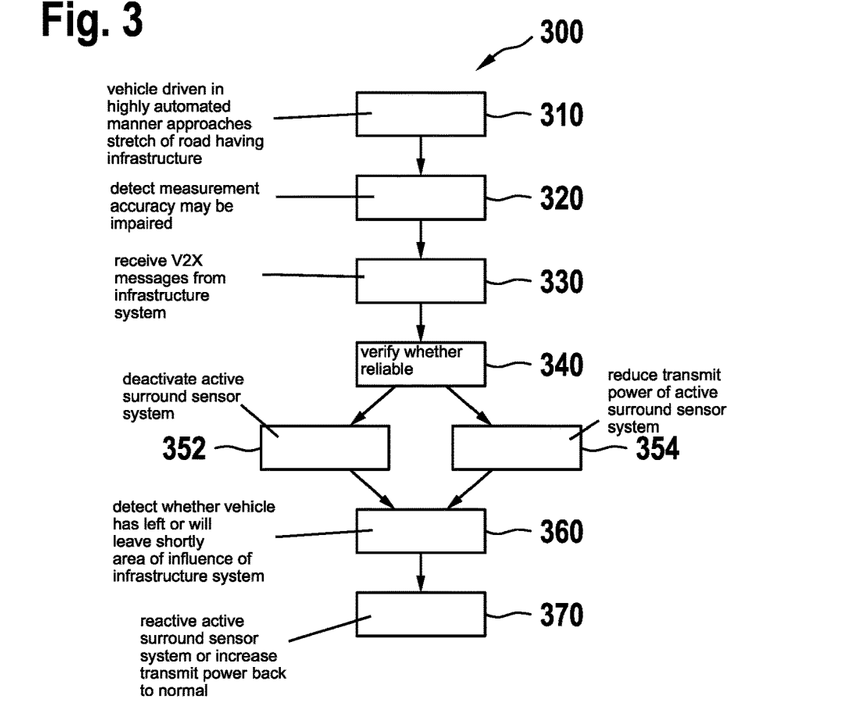
FIG. 3 is a flow chart of a method according to an exemplary embodiment of the first aspect of the present invention.

FIG. 3 is a flow chart 300 of a method for controlling a transmit power of at least one active vehicle surround sensor of a vehicle driven in an at least partially automated manner according to a possible exemplary embodiment of the first aspect of the present invention.

In a first step 310, a vehicle driven in a highly automated manner approaches a particular stretch of road having an infrastructure, for example a tunnel. The vehicle may have a digital map and position determination, it being possible to determine the current position of the vehicle on the map by way of the position determination (for example via GPS or other satellite-based location methods). Furthermore, the map may include additional road information regarding particular surroundings conditions that might impair the surround sensor system on board the vehicle.

In a second, optional step 320, on the basis of the current position of the vehicle and the road information of the map, it is detected that, in the region of the tunnel that the vehicle is approaching, the measurement accuracy of an active surround sensor system on board the vehicle, for example a front radar sensor, may be impaired, for example owing to the transmitted radar signals being reflected at the tunnel entrance, and that there is an available infrastructure system able to supply corresponding surroundings information so that the highly automated driving function can still be executed safely even when the active surround sensor system on board the vehicle can no longer supply trustworthy surroundings information.

In step 330, the vehicle receives V2X messages from the infrastructure system. These V2X messages may, for example, contain object lists. For example, a V2X message is configured as a collective perception message (CPM) that comprises a surroundings model having object lists. Alternatively or additionally, a V2X message may comprise direct control commands. By way of example, the messages may be transmitted via direct communication technology such as dedicated short-range communication (DSRC) or cellular vehicle-to-anything communication (C-V2X) or via mobile communications.

In step 340, it is verified whether the information transferred by way of the V2X messages is reliable. Various criteria can be used for this purpose, for example the plausibility in relation to messages received earlier, a comparison with object lists generated by the surround sensor system on board the vehicle, latency times, and/or other criteria. If it is detected in step 340 that the information transferred by way of the V2X messages is reliable, then either the active surround sensor system on board the vehicle is deactivated in full, in accordance with step 352, or the transmit power of the active surround sensor system on board the vehicle is reduced, in accordance with step 354. In this case, it is possible for the vehicle itself to measure the interference and to decide, on the basis of the result of the interference measurement, whether and to what extent the transmit power is reduced. The reduced transmit power can, for example, be selected such that the range is still adequate for emergency braking but more distant objects can only be received from the infrastructure.

Owing to the measures in accordance with step 352 or step 354, interference with an active surround sensor system of the infrastructure system is effectively avoided, without impairing the safety of a highly automated driving function of the vehicle.

In step 360, it is detected that the vehicle has now left, or will shortly leave, the area of influence of the infrastructure system, i.e., has passed the tunnel, for example.

In step 370, the active surround sensor system on board the vehicle is then reactivated, or the transmit power is increased back to a normal value. By way of example, as soon as no more information is received from the infrastructure system, or as soon as the vehicle has left the region in which the surround sensor system on board the vehicle experiences issues, the surround sensor system on board the vehicle can be reactivated in full. Preferably, the reactivation is already initiated shortly before this so that there is no unsafe period of time in which simultaneously there are no infrastructure data available and the transmit power of the surround sensor system on board the vehicle is still reduced.

Figure 4:
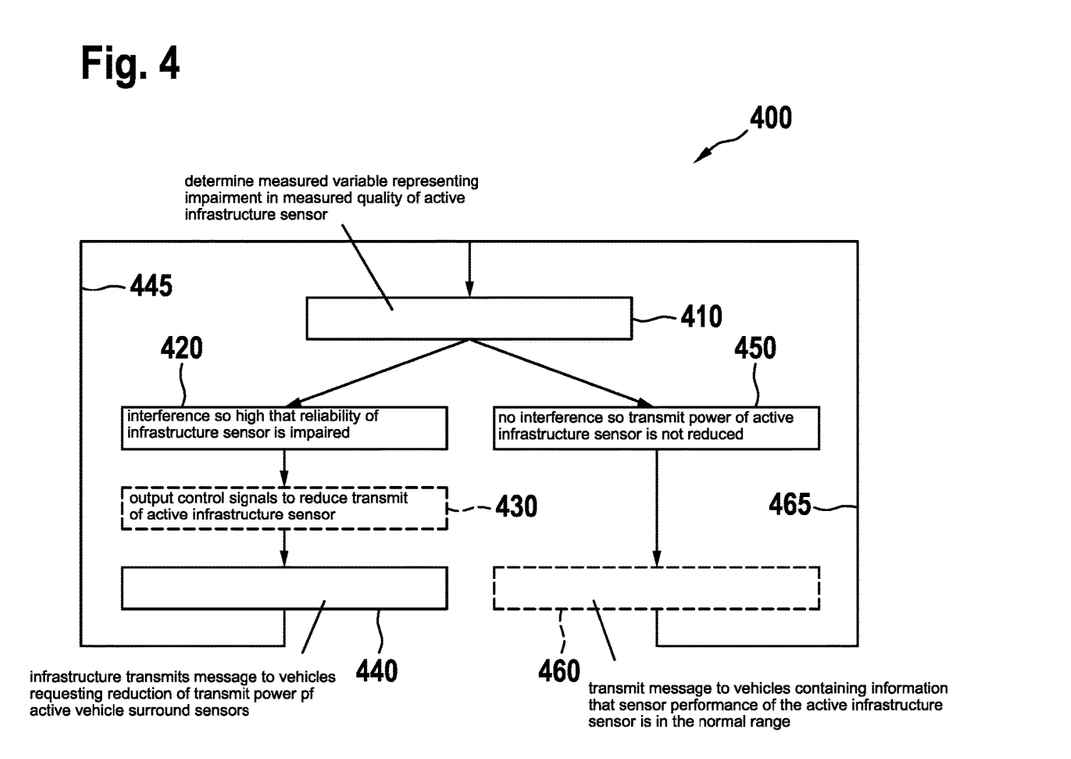
FIG. 4 is a flow chart of a method according to an exemplary embodiment of the fifth aspect of the present invention.

FIG. 4 is a flow chart 400 of a method for controlling a transmit power of at least one active infrastructure sensor of an infrastructure system for assisting at least partially automated driving of a vehicle according to a possible exemplary embodiment of the fifth aspect of the present invention.

In a first step 410, a measured variable representing an impairment in the measurement quality of an active infrastructure sensor owing to interference caused by active vehicle surround sensors of vehicles in the surroundings of the infrastructure system is determined. For this purpose, disruptive signals received from the infrastructure sensor can be identified and a disruptive-signal level can be determined as the measured variable, for example. Alternatively or additionally, a current sensor performance may be determined. By way of example, the measured variable may then be compared with a predetermined threshold.

If, in accordance with step 420, it is revealed that interference between the active infrastructure sensor and the active vehicle surround sensors of the vehicles in the surroundings of the infrastructure system is so high that the reliability of the active infrastructure sensor is impaired, then control signals for reducing the transmit power of the active infrastructure sensor may optionally first be generated and output in step 430. In accordance with step 440, the infrastructure system transmits a message to the vehicles in the surroundings of the one infrastructure system, containing a request to reduce the transmit power of the active vehicle surround sensors of the vehicles.

After a particular length of time has elapsed, the method is restarted, as indicated by the arrow 445.

If, in accordance with step 450, it is revealed that there is no interference between the active infrastructure sensor and the active vehicle surround sensors of the vehicles in the surroundings of the infrastructure system, or the interference is too weak to cause issues, then the transmit power of the active infrastructure sensor is not reduced. If the transmit power of the active infrastructure sensor has been reduced in a previous run-through of the method, the transmit power can now be increased back to a normal value.

In an optional step 460, the infrastructure system may then transmit a message to the vehicles in the surroundings of the one infrastructure system, containing the information that the sensor performance of the active infrastructure sensor is in the normal range ("All OK").

After a particular length of time has elapsed, the method is restarted, as indicated by the arrow 465.

What is claimed is:

1. A method for controlling a transmit power of at least one active vehicle surround sensor of a vehicle driven in an at least partially automated manner, wherein at least one automated driving function of the vehicle is implemented using surroundings data acquired by the active vehicle surround sensor and/or based on data received from an infrastructure, the method comprising the following steps:
   receiving at least one first message from an infrastructure;
   generating, depending on information in the received first message, control signals for reducing the transmit power of an active vehicle surround sensor, and outputting the generated control signals;
   verifying, based on surroundings conditions, whether the transmit power of the active vehicle surround sensor can be increased again;
   generating, depending on the verification, control signals for increasing the transmit power of the active vehicle surround sensor, and outputting the generated control signals, wherein the first message includes infrastructure surroundings information including an object list, and/or control commands for executing an automated driving function, wherein it is checked whether the automated driving function of the vehicle can be safely executed based on the first message, and the transmit power of the active vehicle surround sensor is reduced based on the check revealing that the automated driving function of the vehicle can be safely executed based on the first message.

2. The method as recited in claim 1, wherein the first message includes a request from the infrastructure to reduce the transmit power of the active vehicle surround sensor.

3. The method as recited in claim 1, wherein, before the transmit power of the active vehicle surround sensor is reduced, it is checked whether the information in the first message is reliable.

4. The method as recited in claim 1, wherein reducing the transmit power of the active vehicle surround sensor includes deactivating the active vehicle surround sensor.

5. The method as recited in claim 1, wherein the transmit power of the active vehicle surround sensor is reduced such that the active vehicle surround sensor can only acquire surroundings information from a vicinity of the vehicle.

6. The method as recited in claim 1, wherein the verifying, on the basis of surroundings conditions, of whether the transmit power of the active vehicle surround sensor can be increased again includes determining a current position of the vehicle relative to the infrastructure, and the transmit power of the active vehicle surround sensor is increased when the vehicle is in a particular relative position to the infrastructure and/or at a particular distance from the infrastructure.

7. A device for controlling a transmit power of at least one active vehicle surround sensor of a vehicle driven in an at least partially automated manner, the device comprising:
   a receiver unit configure to wirelessly receive, first messages from an infrastructure; and
   a control unit configured to control a transmit power of the active vehicle surround sensor;
   wherein the device is configure to:
      receive, using the receiving unit, at least one of the first messages from the infrastructure;
      generate, depending on information in the received first message, control signals for reducing the transmit power of an active vehicle surround sensor, and output the generated control signals;
      verify, based on surroundings conditions, whether the transmit power of the active vehicle surround sensor can be increased again;
      generate, depending on the verification, control signals for increasing the transmit power of the active vehicle surround sensor, and output the generated control signals, wherein the first message includes infrastructure surroundings information including an object list, and/or control commands for executing an automated driving function, wherein it is checked whether the automated driving function of the vehicle can be safely executed based on the first message, and the transmit power of the active vehicle surround sensor is reduced based on the check revealing that the automated driving function of the vehicle can be safely executed based on the first message.

8. A driver-assistance system for driving a motor vehicle in an at least partially automated manner, comprising:
   at least one active vehicle surround sensor;
   a device configured to control transmit power of the vehicle surround system, the device including:
      a receiver unit configure to wirelessly receive, first messages from an infrastructure; and
      a control unit configured to control the transmit power of the active vehicle surround sensor;
      wherein the device is configure to:
         receive, using the receiving unit, at least one of the first messages from the infrastructure;
         generate, depending on information in the received first message, control signals for reducing the transmit power of an active vehicle surround sensor, and output the generated control signals;
         verify, based on surroundings conditions, whether the transmit power of the active vehicle surround sensor can be increased again;
         generate, depending on the verification, control signals for increasing the transmit power of the active vehicle surround sensor, and output the generated control signals, wherein the first message includes infrastructure surroundings information including an object list, and/or control commands for executing an automated driving function, wherein it is checked whether the automated driving function of the vehicle can be safely executed based on the first message, and the transmit power of the active vehicle surround sensor is reduced based on the check revealing that the automated driving function of the vehicle can be safely executed based on the first message;

wherein the driver-assistance system is configured to implement at least one automated driving function of the vehicle based on surroundings data acquired by the active vehicle surround sensor and/or based on data received from an infrastructure.

9. The driver-assistance system as recited in claim 8, wherein the active vehicle surround sensor is a radar sensor, or a LiDAR sensor, or an ultrasonic sensor.

10. A motor vehicle, comprising:
a driver-assistance system for driving the motor vehicle in an at least partially automated manner, including:
at least one active vehicle surround sensor;
a device configured to control transmit power of the vehicle surround system, the device including:
a receiver unit configured to wirelessly receive, first messages from an infrastructure; and
a control unit configured to control the transmit power of the active vehicle surround sensor;
wherein the device is configured to:
receive, using the receiving unit, at least one of the first messages from the infrastructure;
generate, depending on information in the received first message, control signals for reducing the transmit power of an active vehicle surround sensor, and output the generated control signals;
verify, based on surroundings conditions, whether the transmit power of the active vehicle surround sensor can be increased again;
generate, depending on the verification, control signals for increasing the transmit power of the active vehicle surround sensor, and output the generated control signals, wherein the first message includes infrastructure surroundings information including an object list, and/or control commands for executing an automated driving function, wherein it is checked whether the automated driving function of the vehicle can be safely executed based on the first message, and the transmit power of the active vehicle surround sensor is reduced based on the check revealing that the automated driving function of the vehicle can be safely executed based on the first message;
wherein the driver-assistance system is configured to implement at least one automated driving function of the vehicle based on surroundings data acquired by the active vehicle surround sensor and/or based on data received from an infrastructure.

11. A method for controlling a transmit power of at least one active infrastructure sensor of an infrastructure system for assisting at least partially automated driving of a vehicle, wherein at least one automated driving function of the vehicle is implemented based on data transmitted by the infrastructure system, the method comprising the following steps:
periodically or continuously determining a measured variable representing an impairment in a measurement quality of the active infrastructure sensor owing to interference caused by active vehicle surround sensors of vehicles in surroundings of the infrastructure system; depending on the measured variable:
(i) transmitting a message to the vehicles in the surroundings of the infrastructure system, the message containing a request to reduce a transmit power of the active vehicle surround sensors of the vehicles; and/or
(ii) performing:
generating control signals for reducing the transmit power of the active infrastructure sensor, and outputting the control signals,
verifying, based on the measured variable, whether the transmit power of the active infrastructure sensor can be increased again, and
generating, depending on the verification, control signals for increasing the transmit power of the active infrastructure sensor, and outputting the control signals, wherein the first message includes infrastructure surroundings information including an object list, and/or control commands for executing an automated driving function, wherein it is checked whether the automated driving function of the vehicle can be safely executed based on the first message, and the transmit power of the active vehicle surround sensor is reduced based on the check revealing that the automated driving function of the vehicle can be safely executed based on the first message.

12. An infrastructure system for assisting at least partially automated driving of a vehicle, the vehicle including:
a driver-assistance system for driving the motor vehicle in an at least partially automated manner, including:
at least one active vehicle surround sensor;
a device configured to control transmit power of the vehicle surround system, the device including:
a receiver unit configured to wirelessly receive, first messages from the infrastructure; and
a control unit configured to control the transmit power of the active vehicle surround sensor;
wherein the device is configured to:
receive, using the receiving unit, at least one of the first messages from the infrastructure;
generate, depending on information in the received first message, control signals for reducing the transmit power of an active vehicle surround sensor, and output the generated control signals;
verify, based on surroundings conditions, whether the transmit power of the active vehicle surround sensor can be increased again;
generate, depending on the verification, control signals for increasing the transmit power of the active vehicle surround sensor, and output the generated control signals, wherein the first message includes infrastructure surroundings information including an object list, and/or control commands for executing an automated driving function, wherein it is checked whether the automated driving function of the vehicle can be safely executed based on the first message, and the transmit power of the active vehicle surround sensor is reduced based on the check revealing that the automated driving function of the vehicle can be safely executed based on the first message;
wherein the driver-assistance system is configured to implement at least one automated driving function of the vehicle based on surroundings data acquired by the active vehicle surround sensor and/or based on data received from the infrastructure; wherein the infrastructure system comprises:
- at least one active infrastructure sensor configured to acquire surroundings information;
- an arithmetic logic unit configured to generate an object list based on the acquired surroundings information, and to generate control commands for executing an automated driving function based on the acquired surroundings information;
- a communication unit configured to transmit the first message, wherein the first message includes the object list and/or the control commands for executing an automated driving function and/or a request to reduce a transmit power of an active vehicle surround sensor of the vehicle.

13. A non-transitory computer-readable medium on which is stored a computer program including commands for controlling a transmit power of at least one active vehicle surround sensor of a vehicle driven in an at least partially automated manner, wherein at least one automated driving function of the vehicle is implemented using surroundings data acquired by the active vehicle surround sensor and/or based on data received from an infrastructure, the commands, when executed by a computer, causing the computer to perform the following steps:
- receiving at least one first message from an infrastructure;
- generating, depending on information in the received first message, control signals for reducing the transmit power of an active vehicle surround sensor, and outputting the generated control signals;
- verifying, based on surroundings conditions, whether the transmit power of the active vehicle surround sensor can be increased again;
- generating, depending on the verification, control signals for increasing the transmit power of the active vehicle surround sensor, and outputting the generated control signals, wherein the first message includes infrastructure surroundings information including an object list, and/or control commands for executing an automated driving function, wherein it is checked whether the automated driving function of the vehicle can be safely executed based on the first message, and the transmit power of the active vehicle surround sensor is reduced based on the check revealing that the automated driving function of the vehicle can be safely executed based on the first message.

* * * * *